UNITED STATES PATENT OFFICE.

HENRY HOFFMAN, OF NEW YORK, N. Y.

IMPROVEMENT IN BRONZING-LIQUIDS.

Specification forming part of Letters Patent No. 18,338, dated October 6, 1857.

*To all whom it may concern:*

Be it known that I, HENRY HOFFMAN, of the city, county, and State of New York, have invented a new and useful Liquid Composition, which I term "Fluid Bronze;" and I do hereby declare that the following is a full, clear, and exact description of the same.

Bronze is commonly applied to the surface of wood, metal, plaster, or stone in the form of powder dusted upon an undercoating of size. This is a troublesome, expensive, and not very permanent method of applying it.

The nature of my invention consists of a fluid-bronze composition formed by combining metallic powder known by the names of "gilding" and "bronze-powder" with collodion, which composition is capable of being applied as a bronze-liquid to surfaces of wood, iron, or any solid material for the purpose of coating the same for decoration and preservation.

To enable others skilled in the art to make and use my invention, I will proceed to describe it.

I take any of the metallic powders known by the name of "bronze-powder," which are a common article of commerce, and I combine it with "collodion," forming the mixture of such a consistency that it can be put on the surface of any material in the same manner as paint with a brush. Collodion is composed of gun-cotton dissolved in liquid ether, and is a common article well known.

When the bronze-fluid, formed as described, is applied to any surface, the ether evaporates rapidly, leaving the bronze adhering with great tenacity to the surface, and covered with a fine transparent skin. As this composition requires very quick application, owing to the volatile character of the ether of the collodion, I generally add about from ten to twenty per cent. of spirits of turpentine to the collodion; but this is not absolutely necessary. A little clear oil may also be added; but it is liable to injure the color of the bronze. Some ether may also be added to the collodion; but it is not absolutely necessary.

The fluid bronze, composed as described, is mixed in a close vessel of glass or stone ware, and is used immediately after it is made; but it may also be manufactured and stored up in closely-sealed glass vessels for future use.

The quantity of bronze-powder required to be mixed with the collodion depends upon the work for which the bronzing is intended. No specific quantity can well be given. The larger the quantity of bronze employed in the fluid of course the richer will be the bronze coating it will impart; but a weaker bronze-fluid laid on in a succession of coats will produce an equally rich surface as a single coat of richer bronze-fluid.

In applying this bronze-fluid the vessel containing it should be kept on ice. The bronze-powder is simply stirred up in the collodion and the mixture is ready for use. This bronzing-fluid dries so rapidly that the article to be bronzed is finished almost at the same time the last touch of it is given with the brush. It forms a coating of a very beautiful and brilliant character, and one that is also air and water tight. Therefore it is capable of standing exposure to water and the weather. It is so durable that it will stand the action of a running stream of water for a few weeks, and by applying it in four or five successive coats to figures of wax the wax may be melted by exposure to heat, and the bronze will remain as a metallic shell the perfect form of the wax figure. It is therefore capable of thus being formed into molds.

The fluid bronze can be applied by the most inexperienced person, whereas bronze-powders applied to decorative purposes requires an experienced workman. It can be applied to wood or iron or any surface directly in their rough state without any under coat of paint or size. It can be applied far more rapidly than bronze in powders, and it allows of all the full freedom of the painter's brush. It is applicable to wood, glass, plaster, stone, or the surface of any article requiring to be bronzed.

I do not claim to be the first inventor of bronzing-liquids, for I am aware that a compound for this purpose was patented in England January 13, 1844, by H. Bessemer. That compound, however, is expensive in its nature and difficult in its manufacture, having no ingredient analogous to mine, save the powdered metal. Bessemer's compound requires the employment of a size in order to secure its proper application; but mine requires nothing of the kind. Bessemer's fluid also requires a long time for drying; but my fluid becomes dry within a few minutes after its application.

Having thus described my invention, I do not confine myself to the objects to which it may be applied, as it may be applied to any solid surface; but

I claim—

The fluid or liquid bronze composition described, for the purposes set forth.

HENRY HOFFMAN.

Witnesses:
I. W. COOMBS,
W. TUSCH.